United States Patent [19]

Hensler

[11] Patent Number: 4,873,068

[45] Date of Patent: Oct. 10, 1989

[54] PROCESS FOR MANUFACTURING TETRASODIUM PYROPHOSPHATE

[75] Inventor: Paul L. Hensler, Lawrence, Kans.

[73] Assignee: FMC Corporation, Philadelphia, Pa.

[21] Appl. No.: 250,053

[22] Filed: Sep. 28, 1988

[51] Int. Cl.$^4$ .................. C01B 15/16; C01B 25/26
[52] U.S. Cl. .................................................. 423/315
[58] Field of Search ............................... 423/314, 315

[56] References Cited

U.S. PATENT DOCUMENTS

| | | | |
|---|---|---|---|
| 2,019,665 | 11/1935 | Fiske et al. | 423/315 |
| 2,019,666 | 11/1935 | Fiske et al. | 423/315 |
| 2,811,419 | 10/1957 | Hartlapp et al. | 23/107 |
| 2,898,189 | 8/1959 | Rodis et al. | 423/315 |
| 3,094,382 | 6/1963 | Bigot | 423/315 |
| 3,230,041 | 1/1966 | Edwards et al. | 23/107 |
| 3,361,523 | 1/1968 | Shen | 23/106 |
| 3,379,497 | 4/1968 | Moore | 23/106 |
| 3,387,923 | 6/1968 | Shen | 23/106 |
| 3,449,068 | 6/1969 | Hartlapp et al. | 23/105 |
| 3,473,889 | 10/1969 | Shen | 423/315 |
| 3,981,974 | 9/1976 | Coad et al. | 423/315 |
| 4,276,273 | 6/1981 | McGilvery | 423/305 |

FOREIGN PATENT DOCUMENTS

| | | | |
|---|---|---|---|
| 629350 | 10/1961 | Canada | 423/315 |
| 2026535 | 12/1971 | Fed. Rep. of Germany | 423/315 |

OTHER PUBLICATIONS

Morey et al., "The Binary System $NaPO_3-Na_4P_2O_7$", Am. J. Science, 242,1 (1944) pp. 4–5.
Van Wazer, Phosphorus and Its Compounds, vol. I, Interscience Publishers, Inc. N.Y. (1958) pp. 616–649.
Faith et al., Industrial Chemicals, John Wiley & Sons, Inc., N.Y. (1965) pp. 699–701.

Primary Examiner—Gregory A. Heller
Attorney, Agent, or Firm—R. E. Elden; F. Ianno

[57] ABSTRACT

A process is provided for manufacturing tetrasodium pyrophosphate from sodium tripolyphosphate and a sodium salt capable of forming sodium carbonate on calcination. A compound capable of forming sodium carbonate is added to adjust the mol ratio to about 2, the mixture is milled and heated to from 300° C. to 700° C.

7 Claims, 1 Drawing Sheet

PROCESS FOR MANUFACTURING TETRASODIUM PYROPHOSPHATE

The invention is a process for manufacturing tetrasodium pyrophosphate by mixing sodium tripolyphosphate and a sodium salt and calcining the mixture.

Sodium tripolyphosphate (STPP) and to a lesser degree, tetrasodium pyrophosphate (TSPP) are well known condensed phosphates used by the detergent industry. Both are generally prepared by dehydrating and calcining sodium orthophosphates.

Alkali metal tripolyphosphates are produced by a wide variety of processes such as by calcining in rotary kilns, spray dryers and the like. These processes produce finely divided particles of tripolyphosphate. Dust created by the handling of these finely divided particles causes housekeeping and health problems. The problems generally necessitate the separation of the finely divided particles from the larger particles. The larger particles having granular characteristics are relatively dust free and generally are preferred. The finely divided particles having powdery characteristics frequently are stored and then sold to customers who are willing to handle the powdery material. Since the relatively dust free granular product is generally preferred by most customers, large inventories of the powdery material may become a serious problem.

U.S. Pat. No. 3,387,923 teaches a process to agglomerate finely divided particles of alkali metal tripolyphosphates by heating the particles to between 560° C. and 620° C. to form viscid-surfaced particles below the transition temperature at which all of the tripolyphosphate is converted to a mixture of tetrasodium pyrophosphate solids and a solution of sodium metaphosphate. Morej et al., "The Binary System $NaPO_3$-$Na_4P_2O_7$", Am. J. Science, 242,1 (1944) discloses that sodium tripolyphosphate melts incongruently at 622° C. to form crystalline sodium pyrophosphate and a liquid metaphosphate. Only at 830° C. does the melt become completely liquid. In general, it is known to be necessary to have some liquid phase present to convert one condensed phosphate, such as TSPP, to another, such as STPP.

U.S. Pat. No. 3,379,497 to Moore discloses that the thermal conversion of orthophosphates and condensed phosphates to form tripolyphosphate does not usually take place when the phosphates have been completely dehydrated. For example, a mixture of tetrasodium pyrophosphate and sodium trimetaphosphate alone when heated at 620° C. does not react to form sodium tripolyphosphate. The patent teaches that in the presence of ammonium nitrate the two compounds will react, and when present in the proper Na:P ratio at a temperature under 620° C., will form sodium tripolyphosphate substantially free from pyrophosphate and metaphosphate. The patent teaches that the process is useful to improve the assay of STPP containing both TSPP and sodium metaphosphate as impurities.

Unlike STPP, TSPP is usually preferred as a powder. Consequently, it is desirable to avoid agglomerating particles by producing molten or a viscid-surfaced particle. This is not a problem when producing TSPP by dehydrating disodium orthophosphate (DSP) according to U.S. Pat. No. 3,230,041 to Edwards et al. because the granular DSP is converted to dry, granular TSPP without sintering or passing through a non-crystalline phase. The patent teaches that if desired, a fluid or plastic amorphous phase may be formed on the surface of the DSP by adding an ammonium or alkali metal nitrate or nitrite to the DSP, thus speeding up the molecular dehydration.

However, until the present invention there was no method known to convert unsalable STPP powder into TSPP powder without agglomerating the particles either by sintering or by passing through a liquid or plastic (non-crystalline) phase.

The invention is a process for manufacturing tetrasodium pyrophosphate comprising forming a mixture of particles of sodium tripolyphosphate and a sufficient quantity of sodium carbonate or of a sodium salt capable of forming sodium carbonate on heating below 700° C. (calcination) to provide a mol ratio of sodium to phosphorus in the mixture of from 1.90 to 2.10, the particles of the mixture having a sufficiently small size such that at least 95% by weight of the mixture will pass through a 180 micrometer sieve, maintaining the mixture at a temperature of from 300° C. to about 700° C. for a sufficient time to convert at least 95% of the mixture into sodium pyrophosphate without substantially agglomerating the particles. The mol ratio will be preferably 1.97 to 2.03 for a product containing less than 1% sodium metaphosphate and less than 1% sodium orthophosphate. The Na/P mol ratio may be varied in the process from 1.90 to 2.10 depending on the product specifications. A Na/P ratio of 1.995 to 2.005 is most preferred.

Any sodium salt capable of forming sodium carbonate on calcination may be used in addition to sodium carbonate. Exemplary salts are sodium bicarbonate, sodium sesquicarbonate, sodium oxalate, and the like. It is wholly unexpected that the physical mixture of finely divided dry solids would be able to combine stoichiometrically to form TSPP without passing through a sufficiently liquid phase to cause sintering and agglomeration. This is particularly unexpected in that STPP and its decomposition products on heating are in part liquid.

Optionally, an alkali metal nitrate may be added to the reaction mixture to increase the rate of conversion of STPP to TSPP. Surprisingly, the addition of an alkali metal nitrate also does not cause significant sintering or agglomeration.

The best method of practicing the invention is demonstrated by the following examples which are not intended as limitations.

EXAMPLE 1

Figure 1:
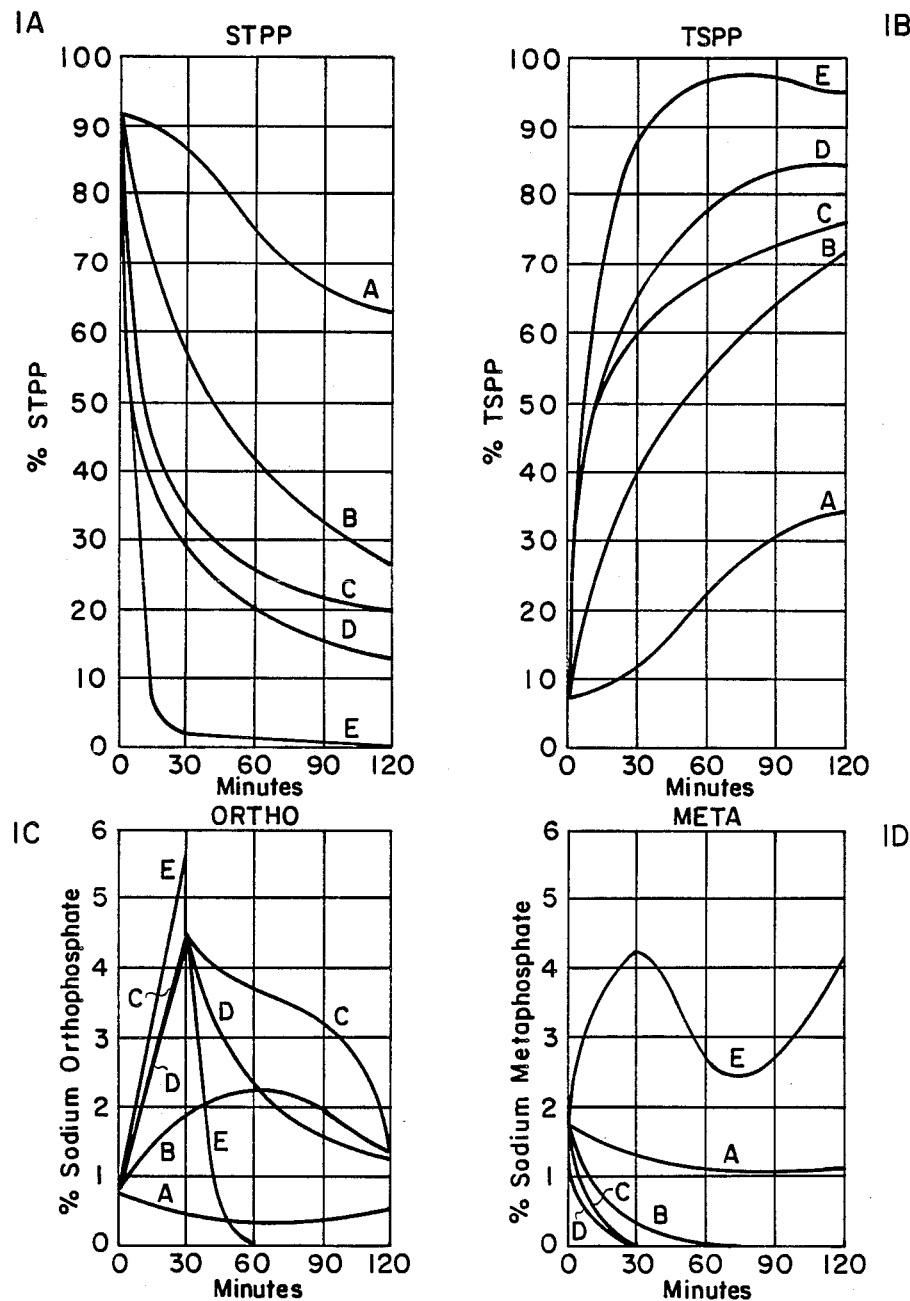
FIGS. 1A, 1B, 1C, and 1D graphically indicate the calcination of samples.

A stock mixture was made by mechanically blending 366 grams of STPP with 73 grams of sodium sesquicarbonate and 4.50 grams of $KNO_3$. Two samples were taken from the mixture; one was milled in a lab pulverizing mill to approximately 100%–150 μm sieve and the other was left "as is". Both samples were calcined in a lab muffle furnace for one hour at 650° C. Assay of the samples showed that all the STPP in the milled sampled reacted with the sodium sesquicarbonate ("sesqui") to yield a calcined product with 98.9% TSPP and 1.1% metaphosphate whereas only 80% of the STPP reacted in the unmilled sample to yield a calcined product with 1.4% orthophosphate, 79.7% TSPP and 18.9% STPP. This example illustrates the importance of using a solid alkali which can be easily mixed with the solid STPP and further homogenized by milling.

EXAMPLE 2

Two mixtures were blended and milled. One contained 366 grams STPP, 73 grams sodium sesquicarbonate and 4.5 grams $KNO_3$ and the other contained 366 grams STPP, 51.4 grams soda ash and 4.5 grams $KNO_3$. Both were calcined for one hour at 650° C. Assay of the calcined products showed that the sodium sesquicarbonate mixture contained 0.6% orthophosphate, ("ortho") 96.1% TSPP, 2.9% STPP and 0.3% metaphosphate ("meta") and that the calcined soda ash mixture contained 0.1% orthophosphate, 96.9% TSPP, 2.5% STPP and 0.4% metaphosphate. This comparison shows that sodium sesquicarbonate and soda ash react equally well with the STPP to form TSPP.

For commercial application, it is important that the reaction of STPP to TSPP occurs rapidly so that the commercial calcining equipment will be a reasonable size. It was found that 650° C. to 700° C. is a particularly desirable calcination temperature range. Example 3 illustrates how temperature affects the rate of reaction.

EXAMPLE 3

Two 40 gram aliquots were taken from a blended, milled mixture of 732 grams STPP, 120 grams sesquicarbonate and 9 grams $KNO_3$. The two aliquots were calcined for two hours at 300° C. and 680° C. Small samples were taken from each aliquot every half hour during the two hours and assayed. The one hour product assay at 300° C. was 0.3% orthophosphate, 21.4% TSPP, 77.5% STPP and 0.8% metaphosphate. This compared with the one hour product assay at 680° C. of 0.0 orthophosphate, 97.2% TSPP, 0.3% STPP and 2.6% metaphospate. This shows that the 680° C. is the more practical temperature.

In the above three examples, potassium nitrate was added to the STPP, alkali mixture to catalyze the conversion of STPP or TSPP. It is important to note that sodium nitrate was also successfully used in Example 4. The only stipulation is that the nitrate salt be a solid free flowing powder so that when the STPP, alkali and nitrate salt are blended, the nitrate will be uniformly distributed throughout the mixture.

EXAMPLE 4

Three samples of 366 grams STPP, 73 grams sodium sesquicarbonate were blended and milled. One contained no $KNO_3$, the second contained 2.2 grams $KNO_3$ and the third contained 4.5 grams $KNO_3$. The three samples were blended, milled and calcined for one hour at 650° C. Assay of the calcined mixture without $KNO_3$ shows that 88% of the STPP was converted to TSPP. Whereas, the assay of the mixture with 2.2 grams of $KNO_3$ showed that 95% of the STPP was converted to TSPP. And to demonstrate further improvement, the assay of the mixture with 4.5 grams of $KNO_3$ showed that 97% of the STPP was converted to TSPP.

EXAMPLE 5

The mol ratio of sodium and phosphorus and its effect on the calcined product assay is critical for controlling orthophosphate and metaphosphate in the product. Example 5 shows that a calcined product with a ratio below 2.000 favors the presence of metaphosphate with no orthophosphates and that the product with ratio above 2.000 favors the presence of orthophosphate with no metaphosphate.

Three mixtures of 366 grams STPP and 4.50 grams $KNO_3$ were made, one with 60 grams, one with 70 grams and the last with 80 grams of sodium sesquicarbonate. The three mixtures were calcined for two hours at 650° C. The calcined mixture with 60 grams of sodium sesquicarbonate had an analyzed ratio of 1.940 and an assay of 0% orthophospate, 93.4% TSPP, 3.2% STPP and 3.4% metaphosphate. The calcined mixture with 70 grams sesquicarbonate had an analyzed ratio of 1.990 and an assay of 0% ortho, 98.9% TSPP, 0% STPP and 1.1% metaphosphate. The calcined mixture with 80 grams sesquicarbonate had an analyzed ratio of 2.030 and an assay of 2.4 orthophosphate, 97.6% TSPP, 0% STPP and 0% metaphosphate.

In summary, the optimum process for producing TSPP powder comprises blending STPP with enough dry sodium alkali to give a final mixture with a Na to P ratio of $2.000 \pm 0.005$. The mixture is homogenized with a nitrate salt catalyst by milling to pass through a 150 μm screen. The homogenized powder is calcined at 650° C. to 700° C. for two hours. This condition produces a powder TSPP which contains at least 98% TSPP with less than 1% orthophosphate which is adequate purity for use as a detergent builder. In each case, the product is free flowing and shows no sign of agglomeration.

EXAMPLE 6

Five 40 gram aliquots from a blended and milled mixture of 732 grams of STPP, 120 grams of sesqui and 9 grams of potassium nitrate were calcined at the five temperatures indicated in FIGS. IA, IB, IC and ID. Small, about 5 gram samples were taken from the 40 gram aliquots during the two hour calcination at 30 minute intervals and assayed. The percents of STPP, TSPP, ortho and meta were then plotted versus time.

The 680° C. curves of FIG. I show how the STPP melts incongruently to form TSPP solid and a liquid phase of ortho and meta. These conditions (temperatures 680° C. and ratio 1.940) satisfied one product specification that the ortho content be below 2% but failed the specification that the meta content be below 1%.

EXAMPLE 7

To further understand the effect the Na/P mol ratio has on the finished assay and for obtaining a finished product with less than 1% meta, nine calcinations were made at three different temperatures and ratios. Results are shown in Table I.

To develop Table I, nine 40 gram aliquots were taken from three preparations each containing 366 grams STPP, 4.5 grams $KNO_3$ together with 60, 70 and 80 grams of sesqui, respectively. The nine aliquots were calcined for two hours in a muffle furnace at 600° C., 650° C. and 700° C. for two hours. Table I shows that at low ratio (1.940) and high temperature (700° C.) the STPP was not quite totally reacted and excess meta was formed.

It also shows that at high ratio (2.030) and the intermediate temperature (650° C.) all the STPP was depleted and excess ortho was formed. The sample with the 1.990 ratio after calcination for two hours at 700° C. assayed 99.2% TSPP and 0.8% meta.

Inspection of Table I indicates a Na/P mol ratio of 1.97 to 2.03 produces a high assay TSPP.

EXAMPLE 8

The next step was to study the catalyzing effect of potassium, sodium and nitrate ions and water. The results are shown in Table II.

Samples were prepared of 366 grams STPP and 73 grams sodium sesquicarbonate and the indicated additive and calcined one hour at 650° C. Table II shows that sodium nitrate was superior as a catalyst.

TABLE I
EFFECT OF Na/P RATIO AND TEMPERATURES ON ASSAY

| Run | Na/P Ratio | Temp. °C. | Assay % | | | |
|-----|------------|-----------|---------|------|------|------|
|     |            |           | Ortho   | TSPP | STPP | Meta |
| 1 | 1.940 | 600 | 0.8 | 79.4 | 19.8 | 0.0 |
| 2 | 1.940 | 650 | 0.0 | 93.4 | 3.2  | 3.4 |
| 3 | 1.940 | 700 | 0.0 | 91.9 | 4.9  | 3.2 |
| 4 | 1.990 | 600 | 2.8 | 81.7 | 15.5 | 0.0 |
| 5 | 1.990 | 650 | 0.0 | 98.9 | 0.0  | 1.1 |
| 6 | 1.990 | 700 | 0.0 | 99.2 | 0.0  | 0.8 |
| 7 | 2.030 | 600 | 8.6 | 77.0 | 14.4 | 0.0 |
| 8 | 2.030 | 650 | 2.4 | 97.6 | 0.0  | 0.0 |
| 9 | 2.030 | 700 | 2.1 | 97.9 | 0.0  | 0.0 |

TABLE II
EFFECT OF ADDITIVES ON CALCINED COMPOSITION

| Additive | % Ortho | % TSPP | % STPP | % Meta | Na/P Ratio |
|----------|---------|--------|--------|--------|------------|
| Control | 2.0 | 85.8 | 10.8 | 1.4 | 1.968 |
| 2.25 Gr. $KNO_3$ | 1.1 | 93.3 | 5.0 | 0.6 | 1.980 |
| 4.50 Gr. $KNO_3$ | 0.7 | 96.1 | 2.9 | 0.3 | 1.990 |
| 6 Gr. $KH_2PO_4$ | 0.8 | 88.1 | 9.8 | 1.3 | 1.956 |
| 3 Gr. $NaNO_3$ | 1.8 | 94.3 | 3.2 | 0.7 | 1.999 |

I claim:

1. A process for manufacturing tetrasodium pyrophosphate comprising forming a mixture of particles of sodium tripolyphosphate and a sufficient quantity of sodium carbonate or a sodium salt capable of forming sodium carbonate on heating below 700° C. to provide a mol ratio of sodium to phosphorus in the mixture of from 1.90 to 2.10, the particles of the mixture having a sufficient small size such that at least 95% by weight of the mixture will pass through a 180 micrometer sieve, maintaining the mixture at a temperature of from 300° C. to about 700° C. for a sufficient time to convert at least 95% of the mixture into sodium pyrophosphate without substantially agglomerating the particles.

2. The process of claim 1 wherein the mixture also contains up to 1% by weight of an alkali nitrate.

3. The process of claim 2 wherein the alkali metal nitrate is sodium nitrate.

4. The process of claim 1 wherein the sodium to phosphorus mol ratio is maintained from 1.97 to 2.03 to provide a sodium pyrophosphate product containing less than 1% sodium metaphosphate and less than 1% sodium orthophosphate.

5. The process of claim 2 wherein the sodium to phosphorus mol ratio is maintained from 1.97 to 2.03 to provide a sodium pyrophosphate product containing less than 1% sodium metaphosphate and less than 1% sodium orthophosphate.

6. The process of claim 3 wherein the sodium to phosphorus mol ratio is maintained from 1.97 to 2.03 to provide a sodium pyrophosphate product containing less than 1% sodium metaphosphate and less than 1% sodium orthophosphate.

7. A process for manufacturing tetrasodium pyrophosphate comprising forming a mixture of particles of sodium tripolyphosphate and a sufficient quantity of a sodium salt capable of forming sodium carbonate on heating below 700° C. to provide a mol ratio of sodium to phosphorus in the mixture of from 1.995 to 2.005, the particles of the mixture having a sufficiently small size such that at least 95% by weight of the mixture will pass through a 150 micrometer sieve, maintaining the mixture at a temperature of from 650° C. to about 700° C. for a sufficient time to convert at least 98% of the mixture into sodium pyrophosphate containing less than 1% sodium orthophosphate without substantially agglomerating the particles.

* * * * *